(12) United States Patent
Ota et al.

(10) Patent No.: US 9,579,862 B2
(45) Date of Patent: Feb. 28, 2017

(54) METHOD FOR MANUFACTURING VEHICLE SEAT COMPONENT

(71) Applicant: TOYOTA BOSHOKU KABUSHIKI KAISHA, Aichi-ken (JP)

(72) Inventors: Hiroki Ota, Inazawa (JP); Tomoki Nii, Kasugai (JP); Kazuaki Toyama, Kariya (JP); Mitsuaki Taniguchi, Toyota (JP); Masahiko Ito, Nagoya (JP); Ryousuke Jyoujima, Toyota (JP); Yoshiyuki Murata, Okazaki (JP); Shinya Kaneko, Nagoya (JP); Tetsuo Hayashida, Toyota (JP); Asakiyo Ishikawa, Nissin (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 451 days.

(21) Appl. No.: 13/857,592

(22) Filed: Apr. 5, 2013

(65) Prior Publication Data

US 2013/0264742 A1 Oct. 10, 2013

(30) Foreign Application Priority Data

Apr. 9, 2012 (JP) ................................. 2012-088197

(51) Int. Cl.
*B29D 99/00* (2010.01)
*B60N 2/56* (2006.01)
*B60N 2/70* (2006.01)
*B29L 31/58* (2006.01)
*B29L 31/00* (2006.01)

(52) U.S. Cl.
CPC ....... *B29D 99/0092* (2013.01); *B60N 2/5657* (2013.01); *B60N 2/7017* (2013.01); *B29C 2793/0045* (2013.01); *B29L 2031/58* (2013.01); *B29L 2031/771* (2013.01)

(58) Field of Classification Search
CPC .......... B60N 2/7017; B29C 2793/0045; B29D 99/0092; B29L 2031/58; B29L 2031/771
USPC ......................... 264/266, 241, 251, 252, 263
See application file for complete search history.

(56) References Cited

U.S. PATENT DOCUMENTS

| | | | |
|---|---|---|---|
| 4,627,664 A * | 12/1986 | Okazaki et al. | 297/452.61 |
| 2004/0084937 A1 * | 5/2004 | Berta | A47C 7/18 297/180.14 |
| 2012/0213880 A1 * | 8/2012 | Nii | B29C 44/145 425/4 R |
| 2013/0099550 A1 | 4/2013 | Ota et al. | |

FOREIGN PATENT DOCUMENTS

| | | |
|---|---|---|
| CN | 102756677 | 10/2012 |
| JP | 2004-8334 | 1/2004 |
| JP | 2013-86679 | 5/2013 |
| WO | 2007/012477 | 2/2007 |

OTHER PUBLICATIONS

Official Action, including English-language translation thereof, for CN 201310117769.7 having an issuance date of Oct. 13, 2015.

* cited by examiner

*Primary Examiner* — Stella Yi
(74) *Attorney, Agent, or Firm* — Greenblum & Bernstein, P.L.C.

(57) ABSTRACT

A method for manufacturing a vehicle seat component includes a first step of integrating a cushion member and an upholstery member together during molding of the cushion member, and a second step of forming a flow passage through which air passes from a back surface of the cushion member toward the upholstery member.

3 Claims, 4 Drawing Sheets

METHOD FOR MANUFACTURING VEHICLE SEAT COMPONENT

INCORPORATION BY REFERENCE

The disclosure of Japanese Patent Application No. 2012-088197 filed on Apr. 9, 2012 including the specification, drawings and abstract is incorporated herein by reference in its entirety.

BACKGROUND OF THE INVENTION

1. Field of the Invention

The invention relates to a method for manufacturing vehicle seat component provided with a blower.

2. Description of Related Art

As this type of vehicle seat, there is a vehicle seat that includes a seat cushion, a seatback, and a blower (see Japanese Patent Application Publication No. 2004-8334 (JP 2004-8334 A)). The blower includes a centrifugal blower mechanism (mechanism that blows air in the centrifugal direction while sucking in external air from the axial direction of the blower). The seat cushion and the seatback each have a cushion member and an upholstery member. Each upholstery member is a saclike member that covers the cushion member, and is made of air-permeable fabric.

The cushion member is an elastic member, and has flow passages (vent grooves and outlet holes). The vent grooves are (linear) recesses formed in the back surface of the cushion member. The outlet holes open, at one end side, on the seating side (upholstery member side) of the cushion member, and communicate, at the other end side, with the vent grooves. The cushion member described above is generally formed by injecting a molding material (molten resin) into a molding die. By forming projections (portions that correspond to the outer shapes of, for example, the outlet holes) inside the molding die, the flow passages are formed simultaneously with the formation of the cushion member.

In the related art, after the flow passages are formed in advance in the cushion member, the surface of the cushion member is covered with the upholstery member. Next, communication is provided between the vent grooves and the blower provided on the back surface side of the cushion member while the vent grooves are sealed by, for example, fitting a lid member onto the back surface of the cushion member. As a result, the air blown out of the blower is supplied to an occupant via the flow passages of the cushion member.

In this type of vehicle seat, an upholstery member may be integrated with a cushion member while the cushion member is molded. For example, if a molding material is injected into a molding die after the upholstery member is disposed in the molding die, the upholstery member and the cushion member are integrated together while the cushion member is molded. However, the configuration described above (integrated configuration) is not very suitable for forming flow passages during the molding of the cushion member, because the upholstery member arranged in a cavity and projections (portions that correspond to the outer shapes of for example, outlet holes) may contact each other. The invention is made in light of the above-described circumstances, and it is an object of the invention to make it possible to apply a cushion member and an upholstery member that are integrated together to a vehicle seat provided with a blower.

SUMMARY OF THE INVENTION

A method for manufacturing a vehicle seat component according to an aspect of the invention is applied to manufacturing of a vehicle seat component that includes a cushion member and an upholstery member that covers the cushion member. In the invention, the cushion member and the upholstery member are integrated together to form the vehicle seat component. It is desirable that this type of seat component be used in a vehicle seat provided with a blower.

The aspect of the invention relates to a method for manufacturing a vehicle seat component, the method including: a first step of integrating a cushion member and an upholstery member together during molding of the cushion member; and a second step of forming a flow passage through which air passes from a back surface of the cushion member toward the upholstery member. According to the aspect of the invention, the flow passage is formed in the second step. Therefore, the cushion member and the upholstery member (which are integrated together into the vehicle seat component) are used in a vehicle seat provided with a blower.

The method for manufacturing the vehicle seat component according to the above-described aspect may be applied to manufacturing of the vehicle seat component that includes the upholstery member having a first portion that is air-permeable and arranged at a seating side of the upholstery member, and a second portion that is laminated on the first portion and that prevents intrusion of a molding material of the cushion member. Because intrusion of the molding material is prevented by the second portion, original properties (e.g. flexibility) of the upholstery member are maintained and the cushion member and the upholstery member are integrated together in the first step. In the method for manufacturing the vehicle seat component according to the aspect of the invention, a thin section that is recessed toward the upholstery member may be formed in a back surface of the cushion member in the first step. Further, in the second step, the flow passage that passes through the thin section and the second portion may be formed. In this configuration, the thin section (portion at which the thickness of the cushion member is relatively small) is formed in the first step. Therefore, it is possible to efficiently form the flow passage in the second step. In addition, the cushion member and the upholstery member that are integrated together may be suitably used in the vehicle seat provided with the blower.

In the method for manufacturing the vehicle seat component according to the aspect of the invention, in the first step, the upholstery member may be integrated with a surface of the cushion member and a backing member may be arranged on the back surface of the cushion member at portions other than a portion at which the thin section is formed. With this configuration, due to the presence of the thin section (portion at which the backing member is not arranged), formation of the flow passage in the second step is facilitated and the back surface of the cushion member is reinforced by the backing member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A to FIG. 4C are sectional views showing a molding die and illustrating a step of integrating the upholstery member and a cushion member together, wherein FIG. 4A shows a state where the upholstery member is held under tension within the molding die, FIG. 4B shows a state where molten resin is injected into the molding die, and FIG. 4C shows a state where the upholstery member and the cushion member are integrated together within the molding die;

DETAILED DESCRIPTION OF EMBODIMENTS

Figure 1:
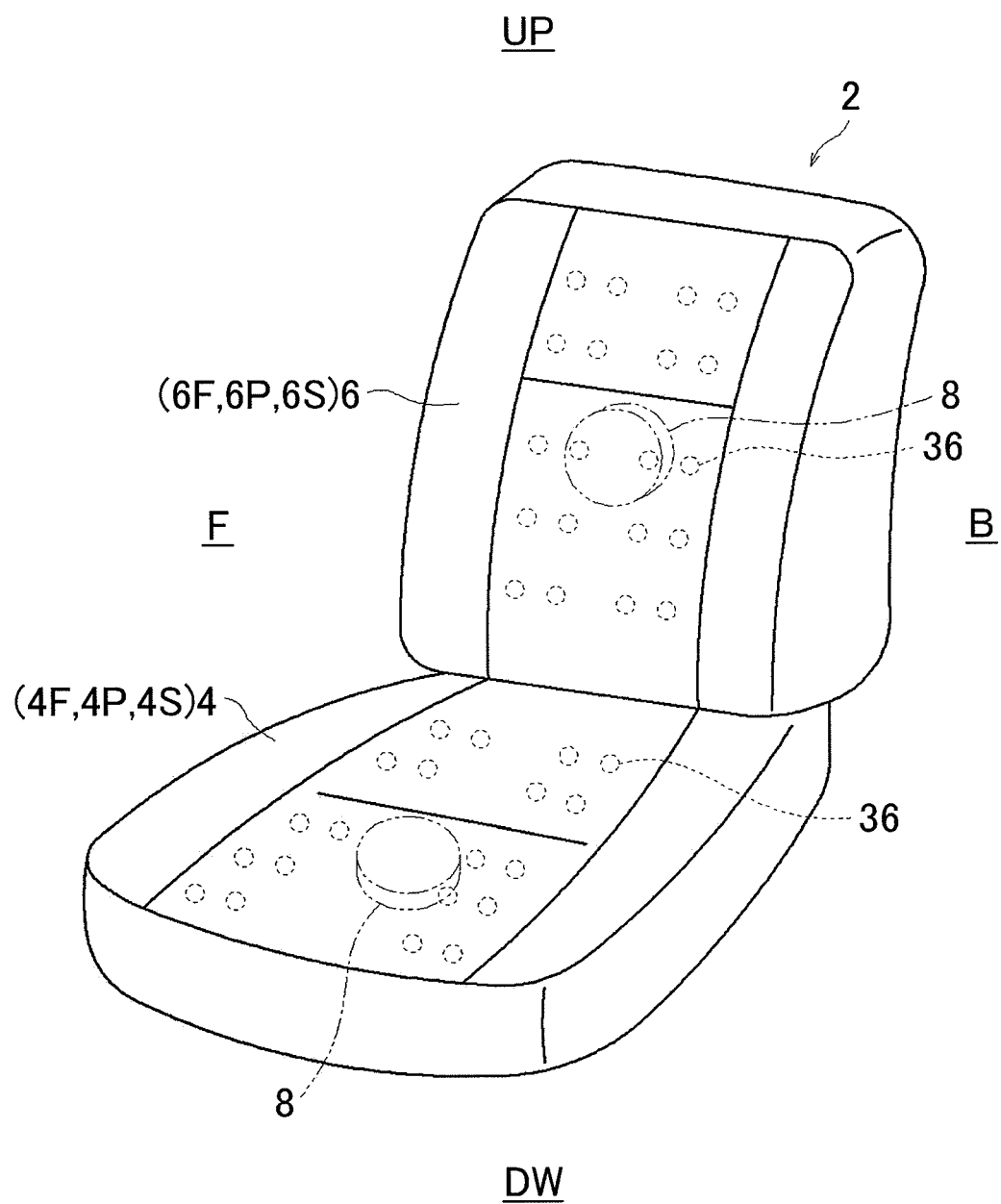
FIG. 1 is a perspective view of a vehicle seat.

Hereafter, embodiments of the invention will be described with reference to FIG. 1 to FIG. 6. In the drawings, "F" denotes the front side of a vehicle seat, "B" denotes the back side of the vehicle seat, "UP" denotes the upper side of the vehicle seat, and "DW" denotes the lower the vehicle seat. In FIG. 1, for the sake of convenience, only some of flow passages are provided with the reference numerals. A vehicle seat 2 in FIG. 1 includes a seat cushion 4 and a seatback 6. The seat cushion 4 and the seatback 6 have frame members (4F, 6F) that form seat frameworks, and seat components. The seat components have cushion members (4P, 6P) and upholstery members (4S, 6S) that cover the cushion members. (4P, 6P) In the vehicle seat 2, a blower 8 (described in detail later) is arranged in at least one of the seat cushion 4 and the seatback 6. In the vehicle seat 2, the air blown out of the blower 8 is supplied to an occupant via the seat component (the cushion member 4P (6P) and the upholstery member 4S (6S)).

In the present embodiment, the cushion member 4P (6P) and the upholstery member 4S (6S) are integrated together during molding of the cushion member 4P (6P) as described later (see FIG. 2). As described above, in the present embodiment, the cushion member 4P (6P) and the upholstery member 4S (6S) are integrated together. It is desirable that this type of seat component be used in the vehicle seat 2 provided with the blower 8. Therefore, in the present embodiment, the cushion member 4P (6P) and the upholstery member 4S (6S) that are integrated together are used in the vehicle seat 2 provided with the blower 8, as described later. Each configuration will be described below in detail.

The blower 8 in the present embodiment is a hollow case body (short cylinder) and has a built-in blower mechanism (see FIG. 1). As the blower mechanism, a centrifugal blower mechanism (mechanism that blows air in the centrifugal direction while sucking in external air from the axial direction of the blower) may be used. Examples of this type of blower mechanism include a multi-blade fan (sirocco fan), a plate fan, a turbo fan, an airfoil fan, and a limit load fan.

The upholstery member 4S (6S) is a planar member that covers the cushion member 4P (6P) described later (see FIG. 2). The upholstery member 4S (6S) in the present embodiment has a first portion 10 (an upholstery section 12, a functional section 14, a spacer section 16) and a second portion 20. The first portion 10 is air-permeable and arranged at the seating side of the upholstery member 4S (6S). The second portion 20 is arranged at the back side of the upholstery member 4S (6S), and prevents intrusion of a molding material of the cushion member 4P (6P) during molding.

Figure 2:
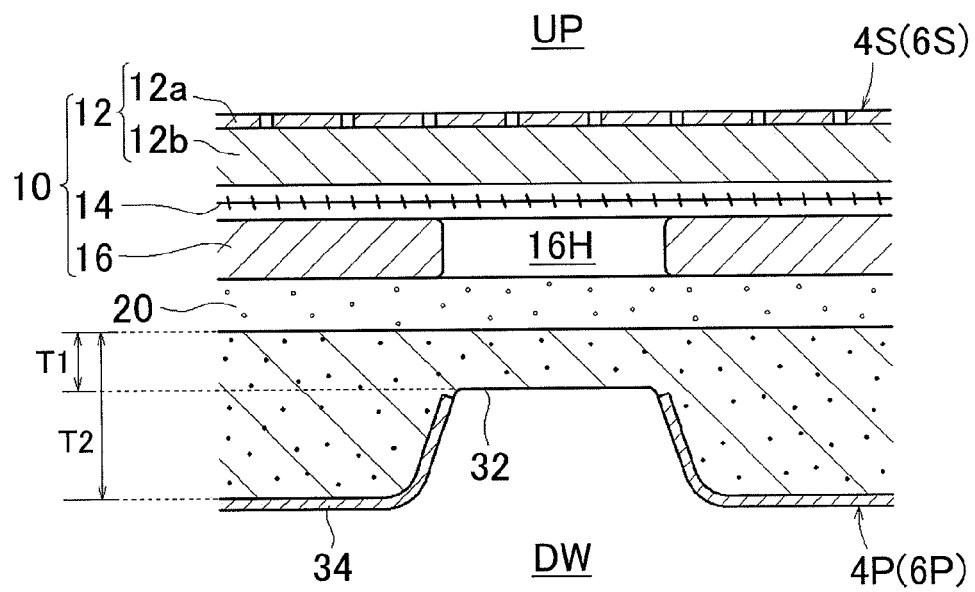
FIG. 2 is a longitudinal sectional view of a vehicle seat component according to an embodiment of the invention.
Figure 3:
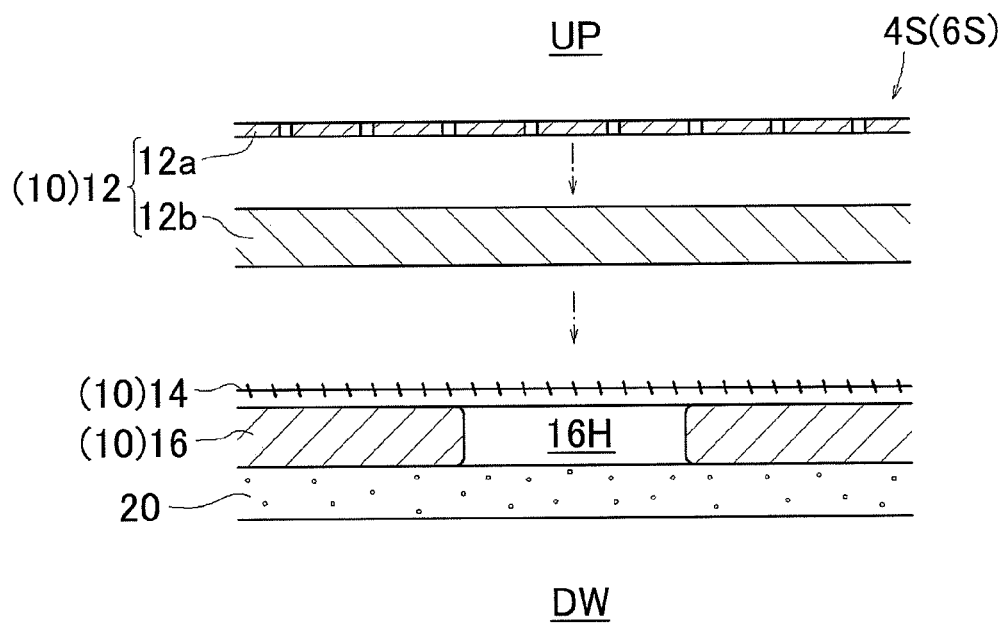
FIG. 3 is an exploded longitudinal sectional view showing an upholstery member.

The first portion 10 has the upholstery section 12, the functional section 14, and the spacer section 16 (see FIG. 2 and FIG. 3). The upholstery section 12 is located at the seating side of the first portion 10, and has a surface member 12a and an air-permeable member 12b. The surface member 12a is located at the seating side of the upholstery member 4S (6S), and may be made of leather (natural leather, synthetic leather) that has through-holes. The air-permeable member 12b is an air-permeable planar member, and is arranged on the back side of the surface member 12a. Examples of the material of the air-permeable member 12b include highly air-permeable slab urethanes (air permeability: 200 cc/cm$^2$·sec to 400 cc/cm$^2$·sec), cotton materials, and 3D net materials (members formed of three-dimensionally woven fibers).

The functional section 14 has functionality, and is generally planar or linear. The functional section 14 in the present embodiment has conductive wires (e.g. metal wires, carbon fibers, plated wire materials), and has a temperature adjusting function (for example, a heater function) and a sensing function. The spacer section 16 is an air-permeable planar portion. Examples of the material of the spacer section 16 include highly air-permeable slab urethanes (air permeability: 200 cc/cm$^2$·sec to 400 cc/cm$^2$·sec), cotton materials, and 3D net materials. In the present embodiment, a plurality of holes 16H is formed in the spacer section 16. The holes 16H pass through the spacer section 16 in its thickness direction, and are aligned with respective thin sections 32 (described later).

The second portion 20 has low air permeability or no air permeability, and is arranged at the back side (the side that faces the cushion member 4P (6P)) of the upholstery member 4S (6S). The second portion 20 is formed of a material that prevents intrusion of a molding material (molten resin) of the cushion member 4P (6P). Examples of this type of material include slab urethanes having low air permeability (air permeability: 0 cc/cm$^2$·sec to 10 cc/cm$^2$·sec), cotton materials, leathers, and resin layers (resin films).

In the present embodiment, the surface member 12a and the air-permeable member 12b are laminated and integrated together through adhesion or fusion (lamination) to form the upholstery section 12 (see FIG. 3). Similarly, the spacer section 16 and the second portion 20 are integrated together through adhesion or fusion. Next, the functional section 14 is arranged between the upholstery section 12 and the spacer section 16, and the upholstery section 12 and the spacer section 16 are integrated together through adhesion or fusion. After the first portion 10 (the upholstery section 12, the functional section 14, the spacer section 16) and the second portion 20 are integrated together in a laminated state (after the upholstery member 4S (6S) is formed) in the above-described manner, the upholstery member 4S (6S) is integrated with the cushion member 4P (6P) described later.

Figure 6:
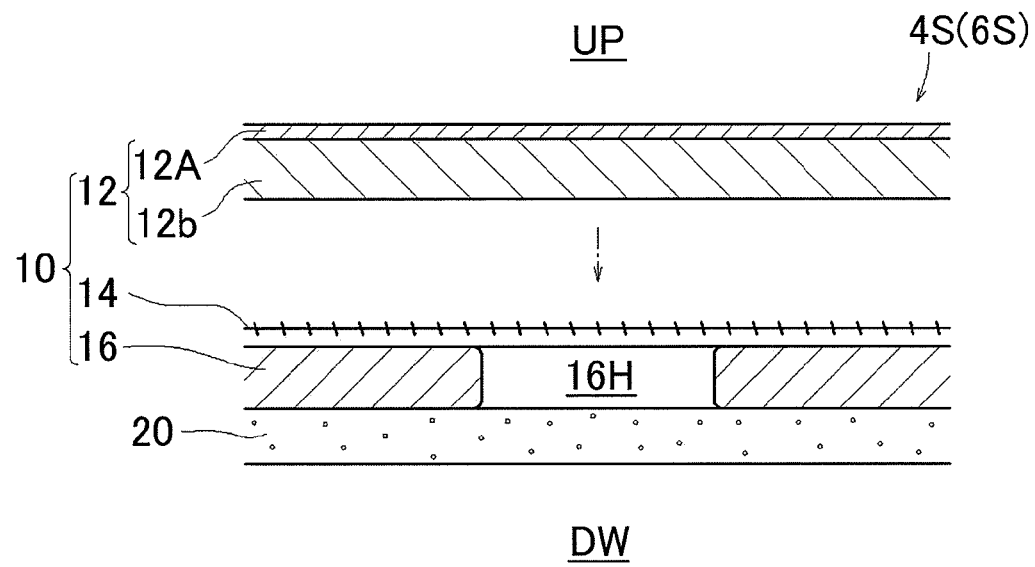
FIG. 6 is an exploded longitudinal sectional view showing an upholstery member according to an alternative embodiment of the invention.

The upholstery section may have various configurations other than the above-described configuration (see FIG. 6). For example, in an alternative embodiment of the invention, the upholstery section 12 has a surface member 12A made of air-permeable fabric (woven fabric, knitted fabric, non-woven fabric). Further, in the alternative embodiment, the surface member 12A and the air-permeable member 12b are integrated together in advance, and the spacer section 16 and the second portion 20 are integrated together in advance. Next, the functional section 14 is arranged between the upholstery section 12 and the spacer section 16, and the upholstery section 12 and the spacer 16 are integrated together through adhesion or fusion.

The cushion member 4P (6P) is a member (generally rectangular shape) that defines the seat shape, and has the thin sections 32 and a backing member 34 (see FIG. 2). Although the material of the cushion member 4P (6P) is not particularly limited, polyurethane foams (density: 10 kg/m$^3$ to 60 kg/m$^3$) may be used. In the present embodiment, flow passages 36 (described later) are formed in the cushion member 4P (6P), so that the air from the blower 8 is allowed to pass through the cushion member 4P (6P).

The backing member 34 is a planar member that reinforces the cushion member 4P (6P) (see FIG. 2). Although the material of the backing member 34 is not particularly limited, a material that has less elasticity than the cushion member 4P (6P) is generally used. Examples of the material of the backing member 34 include fabrics as fiber layers (woven fabrics, knitted fabrics, non-woven fabrics), resin layers (natural resins, synthetic resins), and leathers. Among these materials, spunbonded non-woven fabric (Tafnel (registered trademark) produced by Mitsui Chemicals) is suitably used as the backing member 34.

The thin sections 32 are recesses that are recessed toward the upholstery member 4S (6S), and are formed in the back surface of the cushion member 4P (6P) (see FIG. 2). The shape of each thin section 32 is not particularly limited. For example, the thin section 32 may be formed into a linear shape that extends in the front-rear direction or the width direction of the seat or may be formed into a plurality of dots aligned along the front-rear direction or the width direction of the seat. In the present embodiment, a thickness T1 of the cushion member 4P (6P) in positions where the thin sections 32 are formed is set less than a thickness T2 of the cushion member 4P (6P) in other positions (where the thin sections 32 are not formed). The thickness T1 may be set to half the T2 or less. Further, when the back side of the cushion member 4P (6P) is covered with the backing member 34, the portions where the thin sections 32 are formed are not covered with the backing member 34 (the cushion member 4P (6P) is exposed at these portions). Because the cushion member 4P (6P) is exposed at the thin sections 32, and the flow passages 36 (described later) are relatively easily formed.

A first step of manufacturing of the vehicle seat component will be described below. As shown in FIG. 2 and FIG. 4A to FIG. 4C, the cushion member 4P (6P) is integrated with the upholstery member 4S (6S) while the cushion member 4P (6P) is molded by a molding die 50. The molding die 50 includes a first die 51, a second die 52, and a cavity 54 (space having a shape that corresponds to the outer shape of the cushion member) formed between the first die 51 and the second die 52. The second die 52 is a mating die for the first die 51, and the first die 51 and the second die 52 are closed to form the cavity 54. The first die has an injection passage 56 (a hole that passes through the first die 51 in the up-down direction) through which the molten resin is injected into the cavity 54. The second die 52 has a discharge passage 58 (a hole that passes through the second die 52 in the up-down direction) through which the air is discharged from the cavity 54 to the outside. The back surface of the first die 51 has a shape that corresponds mainly to the shape of the back surface of the cushion member 4P (6P), and has projection portions (not shown) (portions that correspond to the shapes of the thin sections 32). The back surface of the second die 52 has a shape that corresponds mainly to the shape of the seating side of the cushion member 4P (6P).

Figure 4A:
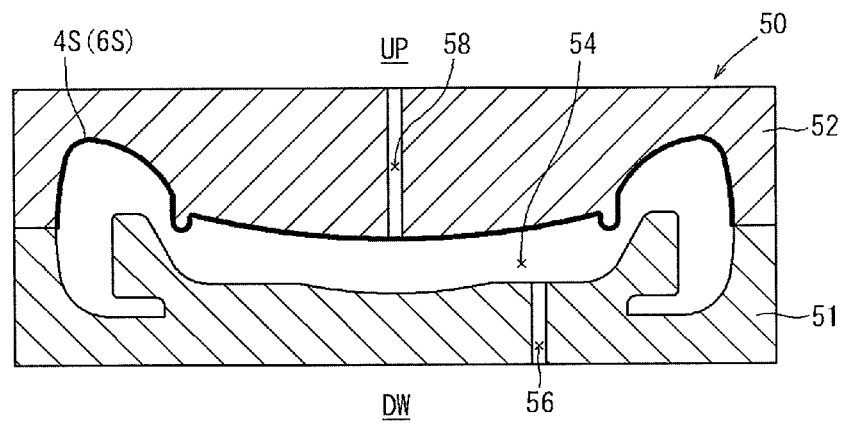
Figure 4B:
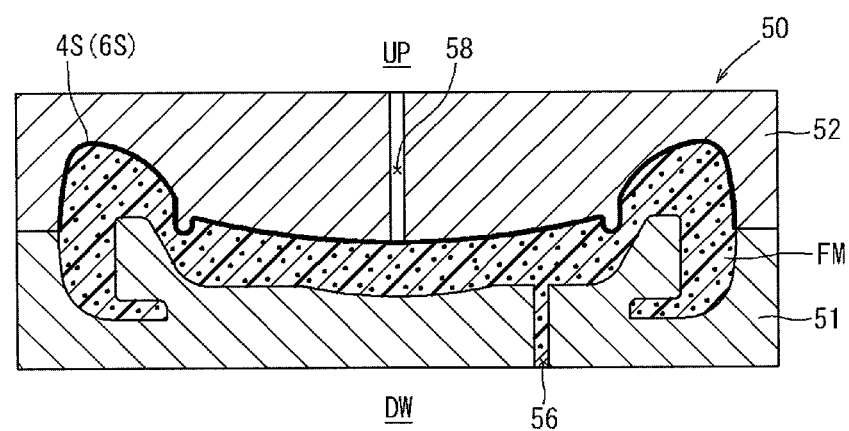
Figure 4C:
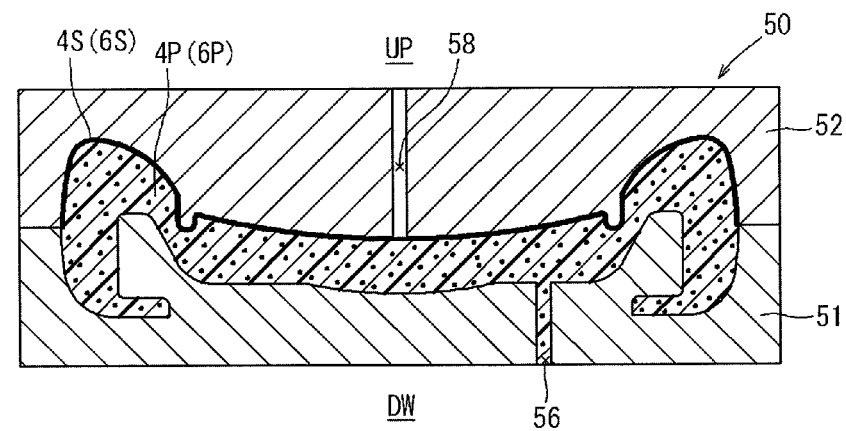

In the present embodiment, the upholstery member 4S (6S) is arranged between the first die 51 and the second die 52, and a molding material FM (e.g. molten resin) is injected into the molding die 50 (see FIG. 4B). Then, the molding material FM is injected into the cavity 54 through the injection passage 56. Thus, the upholstery member 4S (6S) is pushed against the back surface of the second die 52 by the injection pressure of the molding material FM. As the molding material is cured in this state, the upholstery member 4S (6S) is attached integrally to the surface of the cushion member 4P (6P) at the same time that the cushion member 4P (6P) is molded. Because intrusion of the molding material is prevented by the second portion 20, original properties of the upholstery member 4S (6S) are maintained and the cushion member 4P (6P) and the upholstery member 4S (6S) are appropriately integrated together. In addition, the thin sections 32 are formed in the back surface of the cushion member 4P (6P) by (the projection portions of) the first die 51 at the same time of molding of the cushion member 4P (6P). At this time, contact between the upholstery member 4S (6S) and the projection portions is avoided by arranging the upholstery member 4S (6S) on the back surface side of the second die 52. Then, in the first step, the backing member 34 is fitted to the back surface of the molded cushion member 4P (6P) through adhesion or fusion.

Figure 5:
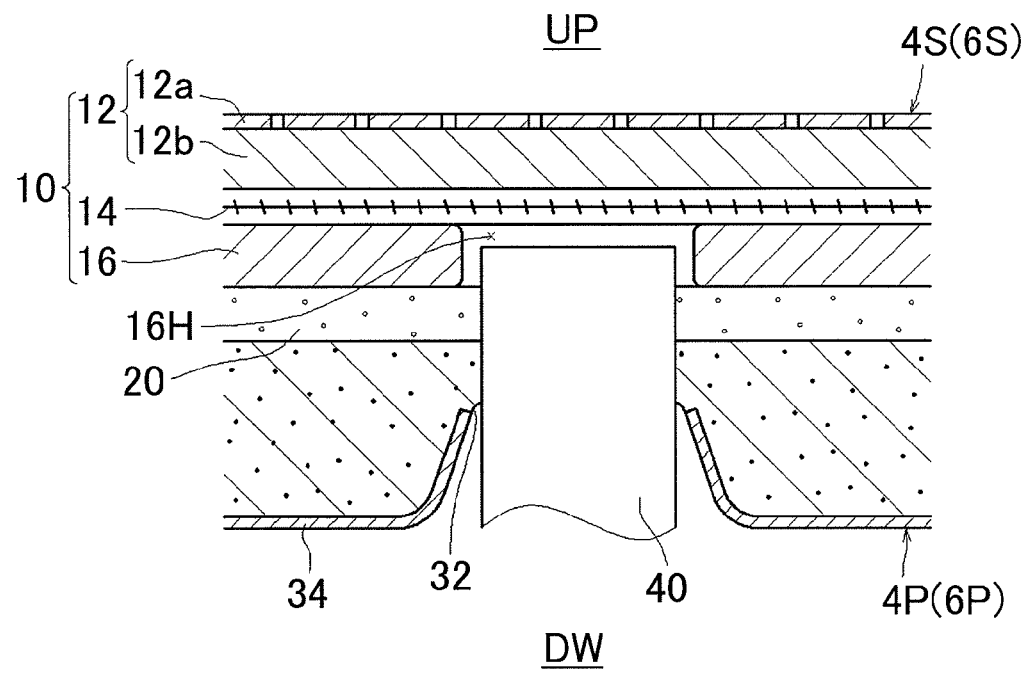
FIG. 5 is a longitudinal sectional view of the seat component during formation of an introduction hole.

A second step of manufacturing of the vehicle seat component will be described below. As shown in FIG. 1 and FIG. 5, the flow passages 36 (the portions through which the air from the blower 8 flows) are formed in the cushion member 4P (6P). In the present embodiment, the seat component is placed on a base (not shown) with the cushion member 4P (6P) side pointing downward (see FIG. 5). Punch members 40 (columnar shape) having cutting edges at their tips are arranged below the base. The punch members 40 are movable up and down with respect to the base and are mounted on a support portion (not shown). The punch members 40 are moved up toward the seat component on the base, using the thin sections 32 as targets. In this way, the flow passages 36 (holes) are formed. In this process, because the thin sections 32 (portions at which the thickness of the cushion member is relatively small) have been formed, the flow passages 36 are formed efficiently. Further, because the backing member 34 is not arranged at the positions where the thin sections 32 are formed, the punch members 40 smoothly enter the cushion member 4P (6P). In the present embodiment, after the multiple flow passages 36 are formed in the cushion member 4P (6P), communication is provided between the flow passages 36 and the blower 8.

In the second step described above, the punch members 40 may reach the functional section 14 and thereby cause damage to the functional section 14 (see FIG. 5). To avoid this problem, in the present embodiment, the spacer section 16 is provided between the second portion 20 and the functional section 14 to keep a distance between the second portion 20 and the functional section 14. Therefore, contact between the punch members 40 and the functional section 14 is prevented, and damage to the functional section 14 is prevented or suppressed. Because the spacer section 16 is air-permeable, the punch members 40 need not pass through the spacer section 16. Therefore, even if there are variations in the depths of the flow passages 36, the flow passages 36 are formed without causing damage to the functional section 14, and appropriate air flow is secured (the variations in the depths of the flow passages 36 are absorbed by the spacer section 16). Further, because the holes 16H are formed in the spacer section 16, generation of shavings or the like from the spacer section 16, which would occur during removal of the punch members 40, is appropriately suppressed.

As shown in FIG. 1, one blower 8 is installed on the back side of the seat cushion 4, and another blower 8 is installed inside the seatback 6. The blowers 8 are stably fixed to, for example, the frame members 4F, 6F. The seat component (the cushion member 4P (6P), the upholstery member 4S (6S)) is mounted on the frame member 4F (6F). Next, communication is provided between the blower 8 and the flow passages 36 of the cushion member 4P (6P) via, for example, a pipe member (not shown). With this configuration, the air blown out of the blower 8 is supplied to the occupant via the flow passages 36 of the cushion member 4P (6P) and the upholstery member 4S (6S).

As described above, in the present embodiment, the cushion member 4P (6P) and the upholstery member 4S (6S) are integrated together in the first step. Subsequently, in the second step, the flow passages 36 are formed in the cushion member 4P (6P), so that the air from the blower 8 is passed through the cushion member 4P (6P) from the back surface of the cushion member 4P (6P) toward the upholstery member 4S (6S). In addition, in the present embodiment, because the thin sections 32 (portions at which the thickness of the cushion member 4P (6P) is relatively small) are formed, it is possible to efficiently form the flow passages 36. Further, in the present embodiment, the cushion member 4P (6P) is reinforced by the backing member 34 while the flow passages 36 are easily formed due to the presence of the thin sections 32 (portions at which the backing member 34 is not arranged). Therefore, according to the present embodiment, it is possible to apply the cushion member 4P (4P) and the upholstery member 4S (6S) that are integrated together to the vehicle seat 2 provided with the blower 8.

The vehicle seat 2 according to the invention is not limited to the embodiments described above, but may be implement in various other embodiments. In the above-described embodiments, the molding die 50 that includes the first die 51 and the second die 52 is used. Alternatively a manufacturing device that includes a first die, a second die and an intermediate die may be used. Further, the first die 51 and the second die 52 may be configured to slide in the horizontal direction, or may be configured to slide in the vertical direction. In the above-described embodiments, the thin sections 32 are formed in the back surface of the cushion member 4P (6P) in the first step. However, the thin sections 32 may be omitted depending on the seat configuration.

In the above-described embodiments, the functional section 14 is provided in the first portion 10. However, the functional section 14 may be omitted depending on the seat configuration. In this case, the spacer section 16 is provided in the first portion 10 to prevent contact between the upholstery section 12 and the punch members 40. In this way, damage to the upholstery section 12 is prevented or suppressed. In the above-described embodiments, the spacer section 16 has the holes 16H. However, the configuration of the spacer section 16 is not limited to this. The spacer section 16 may have recesses that are recessed toward the seating side, or may be flat. In the above-described embodiment, the backing member 34 is provided in the cushion member 4P (6P). However, the backing member may be omitted. In the above-described embodiments, the flow passages 36 may be formed in at least one of the cushion members 4P, 6P. In the above-described embodiments, the flow passages 36 are formed by the punch members 40 (physical means). However, the method of forming the flow passages 36 is not limited this. Examples of the method of forming the flow passages 36 may include a method that uses optical means such as laser and a method in which the cushion member 4P (6P) is partially dissolved by solvents.

What is claimed is:

1. A method for manufacturing a vehicle seat component that includes a cushion member and an upholstery member that covers the cushion member, the cushion member and the upholstery member being integrated together, the method comprising:
    disposing the upholstery member into a molding die;
    injecting a molding material into the molding die and molding the cushion member;
    integrating the cushion member and the upholstery member together during the molding of the cushion member; and
    forming a flow passage through which air passes from a back surface of the cushion member toward the upholstery member, wherein
    a thin section that is recessed toward the upholstery member is formed in the back surface of the cushion member during the integrating of the cushion member and the upholstery member,
    the upholstery member has a first portion that is air-permeable and arranged at a seating side of the upholstery member, and a second portion that is laminated on the first portion and that prevents intrusion of the molding material of the cushion member, and
    the flow passage is formed to pass through the thin section and the second portion during the forming of the flow passage after the integration of the cushion member and the upholstery member and the molding of the cushion member.

2. The method for manufacturing the vehicle seat component according to claim 1, wherein
    the upholstery member is integrated with a surface of the cushion member and a backing member is arranged on the back surface of the cushion member at portions other than a portion at which the thin section is formed during the integrating of the cushion member and the upholstery member.

3. The method for manufacturing the vehicle seat component according to claim 2, wherein
    the backing member is integrated with the cushion member during the integrating of the cushion member and the upholstery member.

* * * * *